A. W. STEPHENS.
THERAPEUTIC DEVICE FOR THE TREATMENT OF THE EYES OR EARS.
APPLICATION FILED DEC. 24, 1910. RENEWED DEC. 4, 1911.

1,020,724.

Patented Mar. 19, 1912.

2 SHEETS—SHEET 1.

Witnesses:
Chas. H. Smith
A. Hazelwood

Inventor:
Annie W. Stephens
By Harold Serrell
her Attorney.

COLUMBIA PLANOGRAPH CO., WASHINGTON, D. C.

A. W. STEPHENS.
THERAPEUTIC DEVICE FOR THE TREATMENT OF THE EYES OR EARS.
APPLICATION FILED DEC. 24, 1910. RENEWED DEC. 4, 1911.
1,020,724.
Patented Mar. 19, 1912.
2 SHEETS—SHEET 2.
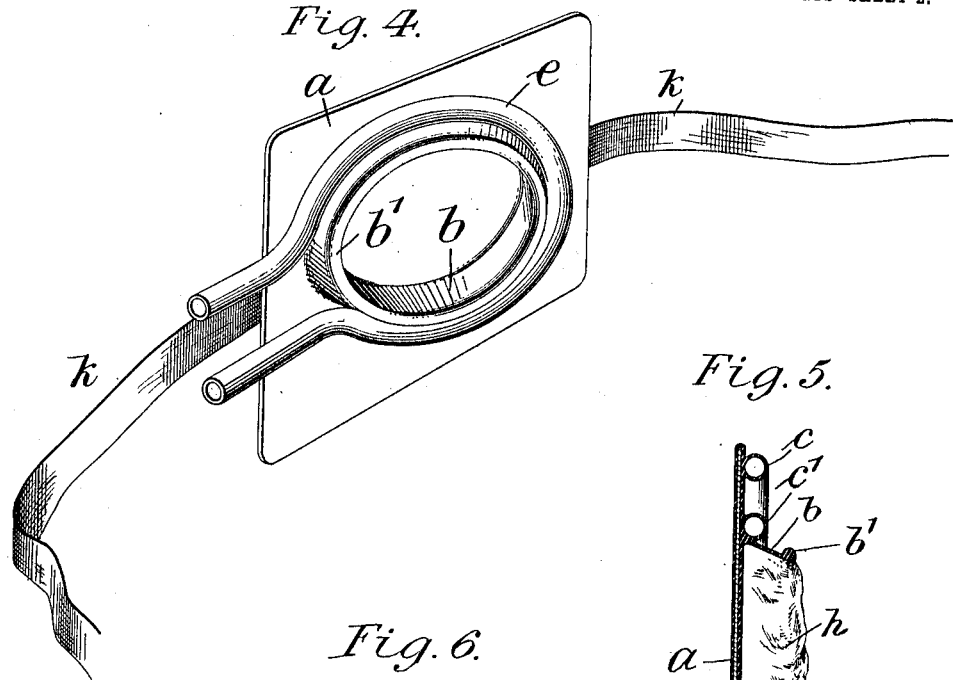
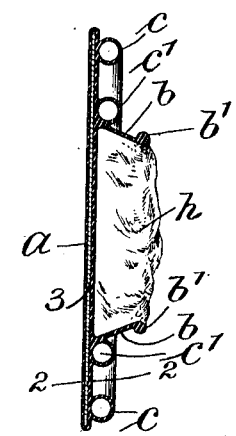
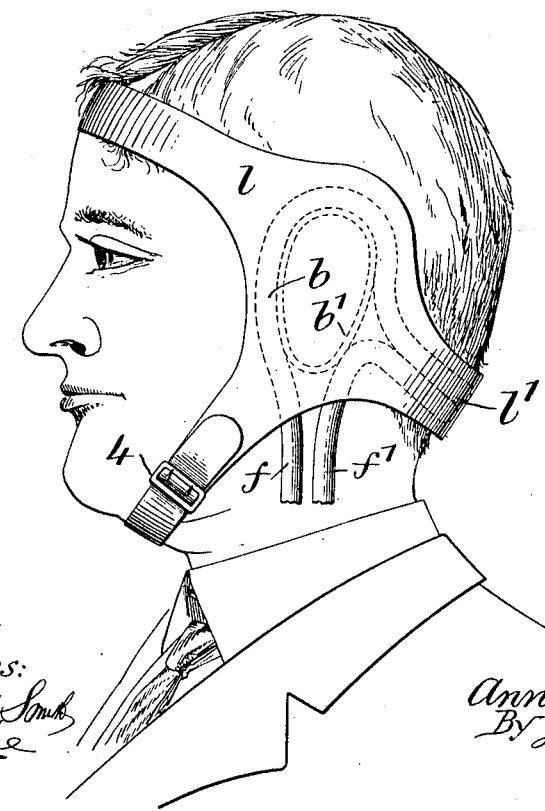
Witnesses:
Inventor:
Annie W. Stephens
By Harold Serrell
her Attorney.

UNITED STATES PATENT OFFICE.

ANNIE W. STEPHENS, OF NEW YORK, N. Y.

THERAPEUTIC DEVICE FOR THE TREATMENT OF THE EYES OR EARS.

1,020,724. Specification of Letters Patent. Patented Mar. 19, 1912.

Application filed December 24, 1910, Serial No. 599,114. Renewed December 4, 1911. Serial No. 663,835.

*To all whom it may concern:*

Be it known that I, ANNIE WICKES STEPHENS, a citizen of the United States, residing in the borough of Manhattan, in the city, county, and State of New York, have invented an Improvement in Therapeutic Devices for the Treatment of the Eyes or Ears, of which the following is a specification.

My invention relates to a structure, the essential features of which,—as a therapeutic device—are applicable to the treatment of the eyes or ears, such as inflammation, aches and any trouble which may be relieved or cured particularly by the presence or application of moisture, heat or cold.

The device of my invention is advantageously made and adapted for use in treating both eyes or both ears, but it may be made single, that is, adapted only to the treatment of one eye or one ear without departing from the spirit of my invention.

In carrying out my invention I employ a foundation of suitable flexible material and of sufficient rigidity not to buckle, pull or become distorted out of shape, and the same is provided with one or more cup-shaped parts to hold a sponge, cotton or soft cloth, and around the cup-shaped part or parts are one of more tubular parts preferably made integral and through which a warm or cold liquid or fluid may be caused to circulate. The material held in the cup-shaped part is adapted to receive, retain and be moistened by a suitable material according to the treatment of the eye or ear desired, and this may be kept warm or cold by the condition of the liquid or fluid material which is caused to circulate through the tubular part or parts. Each cup-shaped part is to be put over an eye or ear and the same, with the foundation, to be held in place in any desired manner. The manner of holding said parts in position and the forms of my invention in which the parts may be single or double are hereinafter more particularly described. It is obvious that the circulating fluid or liquid may be of any temperature desired when operating the device.

Figure 1:
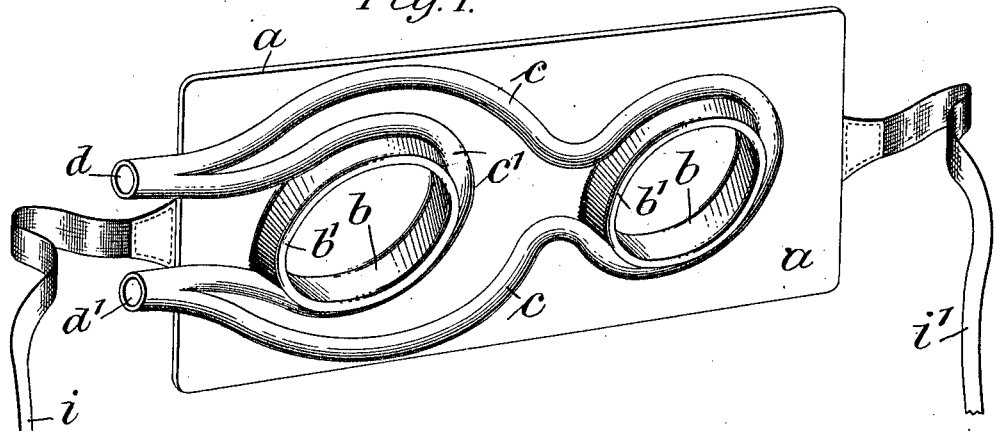
Figure 2:
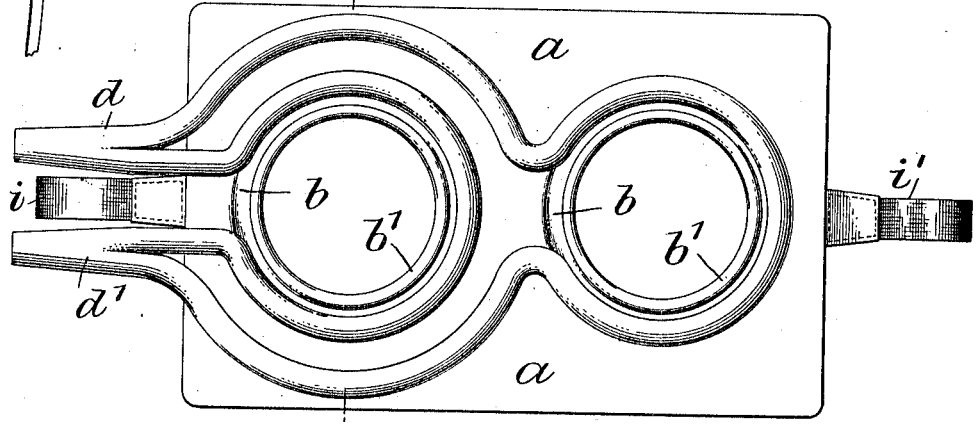
Figure 3:
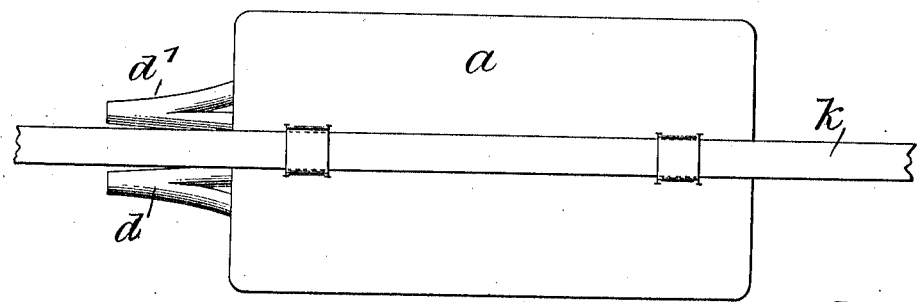

In the drawing Figure 1 is a perspective view and Fig. 2 an elevation of one of the forms of my invention. Fig. 3 is an elevation at the opposite side of the parts shown in Figs 1 and 2 of a smaller size showing a modification with reference to the connecting device or strip. Fig. 4 is a perspective view showing a form of my invention adapted for use upon one eye. Fig. 5 is a cross section at about the dotted line $x, x$, of Fig. 2, illustrative of the body or foundation construction of the device of my invention and the relation of the parts thereto, and Fig. 6 is a perspective view of a form of my invention adapted to be placed over the head of a patient for the treatment of troubles of the ear.

Similar numerals of reference indicate similar parts.

Referring particularly to Figs. 1, 2, 3 and 5, $a$ represents the foundation of suitable flexible material. This foundation is preferably of rubber and between the rubber surfaces 2 I prefer to employ a lining 3 of fabric and rubber for stiffening the same, which parts when vulcanized are integral. This foundation is adapted to yield to conform to the various facial contours. Integral therewith I prefer to form one or more cup-shaped parts $b$ with a yielding edge $b^1$ of greater thickness than the cup-shaped part. This cup-shaped part is advantageously widest at the bottom and narrowest at the yielding edge $b^1$ so that a filling of sponge, cotton or soft cloth $h$ may be placed therein without risk of its falling out. In other words, it is held in the cup by virtue of the shape of the cup and the strength of the yielding edge $b^1$ thereof. The tubular parts through which warm or cold liquid or fluid may be caused to circulate are shown at $c$ $c^1$. These tubular parts are preferably formed integral with the foundation, one of said parts being caused to pass around one cup-shaped part and the other around the other cup-shaped part, with the adjacent ends connected or formed integral at $d$ $d^1$ so as to provide union inlet and exit members which may be provided with suitable couplings for connection with other tubular supply members not shown in the drawing and which tubular supply members bring to the union inlet and exit parts $d$ $d^1$ warm or cold liquid or fluid to be circulated through the tubular parts $c$ $c^1$ for controlling the temperature of the same and that of the cup-shaped parts and their contents. These cup-shaped parts are to be placed at a suitable distance apart which will approximately agree from their centers to the centers of the eyes, and the foundation should be wide to hold the same and the tubular parts and in length to extend around over the eyes and back upon the temples so as to provide a surface support for the tying straps $i$ $i^1$ which are to be passed around the head and tied together.

Fig. 3 is shown solely to indicate that instead of employing the straps $i$ $i^1$ the common strap $k$ may be employed passed through slots formed through the foundation $a$ and along which strap $k$ a lengthwise adjustment of the foundation thereon may be obtained.

In Fig. 4 I have illustrated a smaller foundation $a$ of similar construction not hereinbefore described, and a single tubular part $e$ passing around the cup-shaped part $b$ and preferably formed integral with the foundation.

In the section Fig. 5, the tubular parts, the foundation, the cup-shaped part and the material filling the same are clearly shown.

In Fig. 6 I have shown a head-gear $l$ which is made with foundation or body portions to cover the ears, with a strap to pass over the fore-head, a strap with a buckle 4 to pass under the chin and an integral portion $l^1$ to pass at the back of the head just above the neck and connect the ear parts. The parts of this head-gear covering the ear are to be provided with the cup-shaped part $b$ and its yielding edge $b^1$, and $f$ represents one end of a tubular part which passes around the cup-shaped part of the left ear as shown, then around the inner surface of the member $l^1$ to and around the ear on the right hand side and then returns parallel with the tubular part $f$ on the inner surface of the member $l^1$ and as an end or discharge $f^1$ passes below the said head-gear so that the two free ends of the tubular member may be provided with couplings adapted for connection with a source of supply for the warm or cold liquid or fluid in connection with this form of my invention, similar to the tubular members employed in connection with the form of my invention shown in Figs. 1, 2 to 4 inclusive.

It is obvious that the form of head-gear shown in Fig. 6 is only illustrative of the device adapted to form a foundation and a support for one or more cup-shaped parts and one or more tubular parts.

It is obvious that the inlet and outlet apertures of tubes $d$ $d^1$ may be connected to any character of couplings and tubes, and may be of the same or different diameters.

Where the inlet and outlet tubes are of different diameters it is preferable to make the outlet smaller than the inlet so that the flow of fluid or liquid therethrough will be appreciably retarded and the tubes be kept full.

I do not limit my invention to the exact shape of the cup-shaped part, nor to the exact shape and details of construction of the foundation or tubular parts, nor the exact relation of one or more tubular parts to the foundation or the cup-shaped part.

I claim as my invention:

1. A therapeutic device for the treatment of the eyes or ears, comprising a foundation of suitable material, means for connecting and holding the same to the head, a circular wall upon one surface of said foundation forming a cup-shaped part and a tubular part surrounding the cup-shaped part and also on the same surface of the said foundation.

2. A therapeutic device for the treatment of the eyes or ears, comprising a foundation of suitable material, means for connecting and holding the same to the head, a circular wall upon one surface of said foundation forming a cup-shaped part and a tubular part surrounding the cup-shaped part and also on the same surface of the said foundation, and a filling for the cup-shaped part of suitable material adapted to absorb or hold the treating material in suspension.

3. A therapeutic device for the treatment of the eyes or ears, comprising a foundation of suitable flexible material, a circular wall or cup-shaped part also of flexible material formed integral therewith and upon one surface thereof and a tubular part also of flexible material surrounding the cup-shaped part and formed integral therewith and with the foundation and means for holding said parts in position upon the head.

4. A therapeutic device for the treatment of the eyes or ears, comprising a foundation of suitable flexible material, a circular wall or cup-shaped part also of flexible material formed integral therewith and upon one surface thereof and a tubular part also of flexible material surrounding the cup-shaped part and formed integral therewith and with the foundation, means for holding said parts in position upon the head, and the edge or rim of the cup-shaped part thickened or enlarged and of less diameter than the base of the cup-shaped part, so as to hold therein a material to be moistened.

5. A therapeutic device for the treatment of the eyes or ears, comprising a foundation of suitable flexible material, two spaced apart cup-shaped parts on one surface thereof, two tubular parts each surrounding a cup-shaped part and means connected to the foundation of suitable material for securing the same in position upon the head over the eyes.

6. A therapeutic device for the treatment of the eyes or ears, comprising a foundation of suitable flexible material, two spaced apart cup-shaped parts on one surface thereof, two tubular parts each surrounding a cup-shaped part and said tubular parts merging at common ends into a union inlet and exit and adapted for connection with a source of supply for circulating fluid or liquid, and means connected to the foundation of suitable material for securing the same in position upon the head over the eyes.

Signed by me this 9th day of December 1910.

ANNIE W. STEPHENS.

Witnesses:
GEO. T. PINCKNEY,
E. ZACHARIASEN.